(12) United States Patent
Kolluri Venkata Sesha et al.

(10) Patent No.: US 10,893,115 B2
(45) Date of Patent: Jan. 12, 2021

(54) ON DEMAND AUCTIONS AMONGST CLOUD SERVICE PROVIDERS

(71) Applicant: INTERNATIONAL BUSINESS MACHINES CORPORATION, Armonk, NY (US)

(72) Inventors: Saiprasad Kolluri Venkata Sesha, Bengaluru (IN); Seema Nagar, Bangalore (IN); Sougata Mukherjea, New Delhi (IN); Kuntal Dey, Vasant Kunj (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 16/191,143

(22) Filed: Nov. 14, 2018

(65) Prior Publication Data
US 2020/0153921 A1    May 14, 2020

(51) Int. Cl.
*H04L 29/08* (2006.01)
*H04L 12/24* (2006.01)
*G06N 20/00* (2019.01)

(52) U.S. Cl.
CPC ............. *H04L 67/26* (2013.01); *G06N 20/00* (2019.01); *H04L 41/16* (2013.01); *H04L 41/30* (2013.01); *H04L 67/10* (2013.01); *H04L 67/16* (2013.01)

(58) Field of Classification Search
CPC ......... H04L 67/26; H04L 41/16; H04L 41/30; H04L 67/10; H04L 67/16; G06N 20/00; G06Q 30/08
See application file for complete search history.

(56) References Cited

U.S. PATENT DOCUMENTS

| 8,244,559 B2 | 8/2012 | Horvitz et al. |
| 2003/0041011 A1* | 2/2003 | Grey ............. G06Q 30/08 705/37 |

(Continued)

FOREIGN PATENT DOCUMENTS

| CN | 103886499 A | 6/2014 |
| CN | 105721565 A | 6/2016 |
| WO | 2013192059 A2 | 12/2013 |

OTHER PUBLICATIONS

Toosi, et al., "An Auction Mechanism for a Cloud Spot Market," http://www.cloudbus.org/reports/SpotCloudAuction2014.pdf, 35 pages. Dec. 2, 2014.

(Continued)

*Primary Examiner* — Wing F Chan
*Assistant Examiner* — Billy H Ng
(74) *Attorney, Agent, or Firm* — Christopher Pignato, Esq.; Wayne F. Reinke, Esq.; Heslin Rothenberg Farley & Mesiti P.C.

(57) ABSTRACT

On-demand auctioning of cloud services amongst cloud computing service providers includes publishing, by a client, on a publish-subscribe platform, cloud computing resource requirement(s); subscribing to the publish-subscribe platform by at least two providers of cloud computing service (s); bidding, by each of the at least two providers, on one or more the at cloud computing resource requirement(s) via a bidding platform; selecting, by the client, and publishing on the publish-subscribe platform, at least one of the at least two providers for the cloud computing resource requirement (s); and, in one example, prior to the selecting, cognitively recommending to the client, by a data processing system, one or more of the at least two providers.

20 Claims, 6 Drawing Sheets

(56) References Cited

U.S. PATENT DOCUMENTS

| | | | |
|---|---|---|---|
| 2004/0103040 A1* | 5/2004 | Ronaghi | G06K 13/0825 |
| | | | 705/14.69 |
| 2010/0076856 A1 | 3/2010 | Mullins | |
| 2010/0332262 A1* | 12/2010 | Horvitz | G06F 9/5027 |
| | | | 705/4 |
| 2011/0131335 A1* | 6/2011 | Spaltro | G06F 9/5072 |
| | | | 709/228 |
| 2011/0213712 A1* | 9/2011 | Hadar | G06Q 30/04 |
| | | | 705/80 |
| 2014/0067496 A1 | 3/2014 | Buswell | |
| 2015/0206207 A1 | 7/2015 | Narasimhan et al. | |
| 2015/0228011 A1 | 8/2015 | Dimmler | |
| 2017/0109815 A1* | 4/2017 | Bai | G06Q 30/08 |

OTHER PUBLICATIONS

Nandini, et al., "Implementation of Auction Technique with QoS in Cloud Resource Provisioning," International Journal of Emerging Technology in Computer Science & Electronics (IJETCSE), ISSN: 0976-1353, vol. 21, Issue 4, pp. 46-49. Apr. 2016.

Shi, et al., "An Online Auction Framework for Dynamic Resource Provisioning in Cloud Computing," SIGMETRICS' 14, Jun. 16-20, 2014, Austin, Texas, USA, 13 pages.

\* cited by examiner

ON DEMAND AUCTIONS AMONGST CLOUD SERVICE PROVIDERS

BACKGROUND

Publish-subscribe platforms are known. For purposes of this document, publish-subscribe platforms are defined as any set of computing resources (for example, processor(s), memory hardware, storage hardware, software, firmware, etc.) that provides for a messaging pattern where senders of messages, called publishers, do not program the messages to be sent directly to specific receivers, called subscribers, but instead categorize published messages into classes without knowledge of which subscribers will receive message placed into a given message's corresponding class. Subscribers subscribe to classes in order to receive messages that are of interest, but typically do not have knowledge of which publishers will be contributing messages to the subscribed class. Publish-subscribe is different than a message queue paradigm, and is typically part of a larger message-oriented middleware system. Under a publish-subscribe platform, subscribers typically receive only a subset of the total messages published. The selection, by a subscriber, of selected classes for reception and processing is called filtering. There are two common forms of filtering: topic-based and content-based. In a topic-based publish-subscribe platform, messages are published to "topics" or named logical channels. Subscribers in a topic-based platform will receive all messages published to the topics to which they subscribe, and all subscribers to a topic will receive the same messages. The publisher is responsible for defining the classes of messages to which subscribers can subscribe. In a content-based platform: (i) messages are only delivered to a subscriber if the attributes/content of a given message matches constraints defined by the subscriber; and (ii) the subscriber is responsible for classifying the messages. Some systems support a hybrid of topic-based operations and content-based operations. In many pub/sub platforms, publishers post messages to an intermediary message broker or event bus, and subscribers register subscriptions with that broker, letting the broker perform the filtering. The broker typically performs a store and forward function to route messages from publishers to subscribers.

SUMMARY

Shortcomings of the prior art are overcome and additional advantages are provided through the provision, in one aspect, of a computer-implemented method of on-demand auctioning of cloud computing services. The method includes publishing, by a client, on a publish-subscribe platform, at least one cloud computing resource requirement; subscribing to the publish-subscribe platform by at least two providers of one or more cloud computing service; bidding, by each of the at least two providers, on one or more of the at least one cloud computing resource requirement via a bidding platform; and selecting, by the client, and publishing on the publish-subscribe platform, at least one of the at least two providers for the at least one cloud computing resource requirement.

In another aspect, a system for on-demand auctioning of cloud computing services may be provided. The system may include, for example, a memory and at least one processor in communication with the memory, the memory storing program instructions for performing a method, the program instructions executable by the at least one processor to perform the method. The method may include, for example, publishing, by a client, on a publish-subscribe platform, at least one cloud computing resource requirement; subscribing to the publish-subscribe platform by at least two providers of one or more cloud computing service; bidding, by each of the at least two providers, on one or more of the at least one cloud computing resource requirement via a bidding platform; and selecting, by the client, and publishing on the publish-subscribe platform, at least one of the at least two providers for the at least one cloud computing resource requirement.

In a further aspect, a computer program product for on-demand auctioning of cloud computing services may be provided. The computer program product may include a storage medium readable by a processor and storing instructions for performing a method. The method may include, for example, publishing, by a client, on a publish-subscribe platform, at least one cloud computing resource requirement; subscribing to the publish-subscribe platform by at least two providers of one or more cloud computing service; bidding, by each of the at least two providers, on one or more of the at least one cloud computing resource requirement via a bidding platform; and selecting, by the client, and publishing on the publish-subscribe platform, at least one of the at least two providers for the at least one cloud computing resource requirement.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
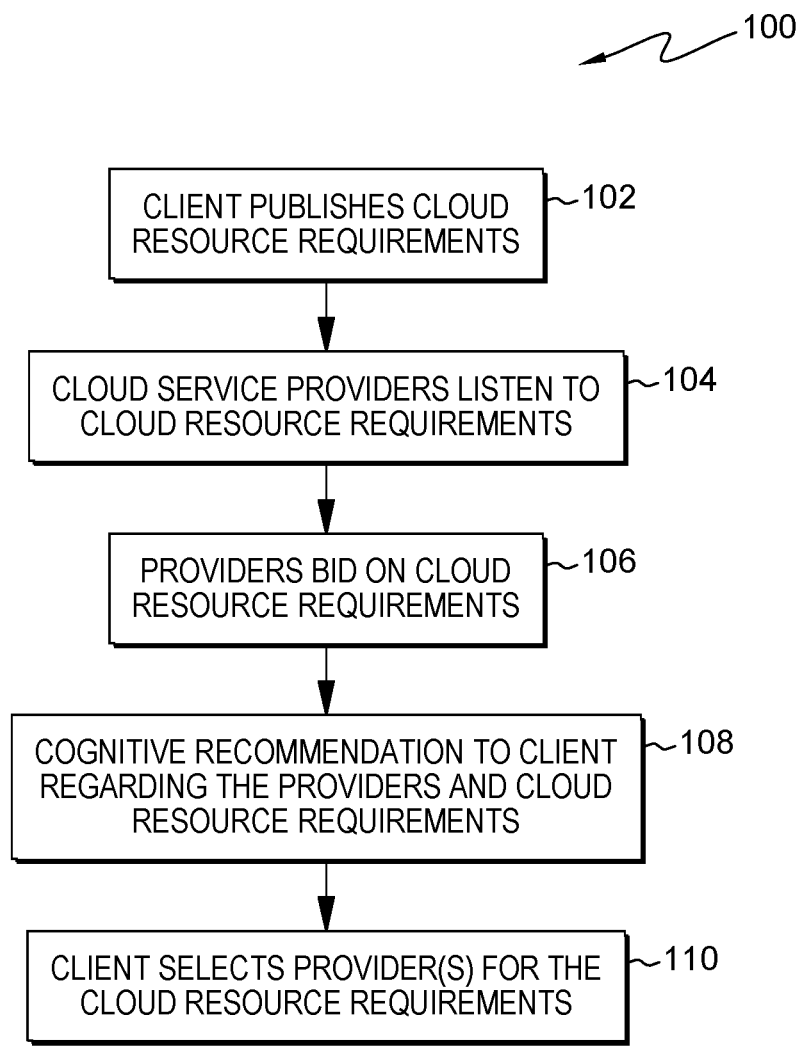
FIG. 1 is a high-level flow diagram for one example of a computer-implemented method of auctioning cloud services, in accordance with one or more aspects of the present disclosure.

Some embodiments of the present invention may recognize one, or more, of the following problems, drawbacks, challenges and/or opportunities for improvement with respect to the current state of the art: (i) clients select a cloud service provider in the "pull" mode by statically or at most dynamically studying its current state and resources; and/or (ii) this pull model can lead to inefficiency in pricing and a potential inefficiency in performance as well.

Disclosed herein, in accordance with one or more aspects of the present invention, is on-demand auctioning of cloud resource requirements of a client based on bids from cloud service providers. The bidding, in one embodiment, may be iterative.

The choice of services consumed from the cloud could potentially range from IaaS, PaaS to SaaS based solutions as well. Pricing inefficiency arises as the process is non-competitive—a cloud service provider has no incentive to optimize the prices based upon its current workload and/or the clients' current/future requirements. The performance inefficiency could arise, as a cloud service provider might be aware of its upcoming load but won't practically ever expose that to a client—so there is always a danger that a cloud may "soon be used for higher priority processes that consume a lot of resources, but the client still selected this cloud over others as at the current time it seemed to be a good choice (based upon its published static view of resources or dynamically obtained test results around efficiency)

Such processes to choose a cloud service provider are vulnerable to the human whims and biases towards certain clouds (people at the client side). This motivates to create a fair-playing ground for the cloud service provider competitors in terms of pricing, performance guarantees (creating Service Level Agreements, and cloud operations adhering to such SLA) and readiness for instant consumption.

As used herein, the term "bidding" (and "bid" or "bids") refers to, in response to receiving or otherwise being made aware of remote computing resource requirements of a potential customer, for example, from the potential customer to an intermediary, making an offer of cloud computing services to the potential customer (or via the intermediary) by a service provider. The offer can include, for example, any type of consideration (e.g., money, credit or cryptocurrency). The offer could instead be based in bartering. A bid may also include agreement terms under which the services would be provided (e.g., a service level agreement). Alternatively, the potential client could provide agreement terms with the computing resource requirements or separately.

As used herein, the term "cloud computing" refers to the use, by a customer, of on-demand remote computing resources of a service provider via auction on a global computer network (e.g., the Internet) to store, manage and/or process data according to the resource requirements of the customer, rather than the use of local computing resources (e.g., a private network). The customer resource requirements can include, for example, pricing desired (or budget), a specific time the resources are needed, a duration of time the resources are needed, whether the customer wants the resources reserved until start time, uptime, a time of completion, a number of operations, a number of API calls, a turn-around-time, etc. Thus, "cloud resources" refers to the remote computing resources of a cloud computing service provider. Remote computing resource examples include servers, storage, databases, networking, software, analytics, cognitive computing, machine learning, email, managed security and virtual computing resources.

As used herein, the term "lead time" refers to an offer-good-until time in a cloud services bid. In some embodiments, it may also refer to a period of time that the bidding cloud service provider blocks or reserves one or more cloud resources included in the client resource requirement and part of the cloud services bid.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

FIG. 1 is a high-level flow diagram 100 for one example of a computer-implemented method of auctioning cloud services, in accordance with one or more aspects of the present disclosure. Initially, a client publishes 102 cloud service resource requirements. Cloud service providers listen 104 for the cloud service resource requirements and bid 106 on at least one of the cloud service resource requirements. The client selects one of the cloud service providers for each cloud resource requirement. Thus, more than one cloud service provider may be selected. The choice of service provider for a given cloud resource is based on the needs of a given client. For example, cost may be of paramount importance for one client, while for another the terms of the agreement for service may be most important. In another example, based on a resource dependency for two or more resource requirements, a client may favor one provider that can provide all of the two or more cloud resources. In one embodiment, prior to selecting by the client, a data processing system analyzes the bids and cognitively recommends 108 to the client a cloud service provider for each of the cloud service resource requirements. The cognitive recommendation may be provided, in one example, by a cognitive recommendation service accessed, for example, by the client via an application programming interface (API) that may be provided, for example, by the cognitive recommendation service.

The customer resource requirements can include, for example, pricing desired (or budget), a specific time the resources are needed, a duration of time the resources are needed, whether the customer wants the resources reserved until start time, uptime, a time of completion, a number of operations, a number of API calls, a turn-around-time, etc. Any or all of these resource requirements, where appropriate, would be made part of a service agreement.

Figure 2:
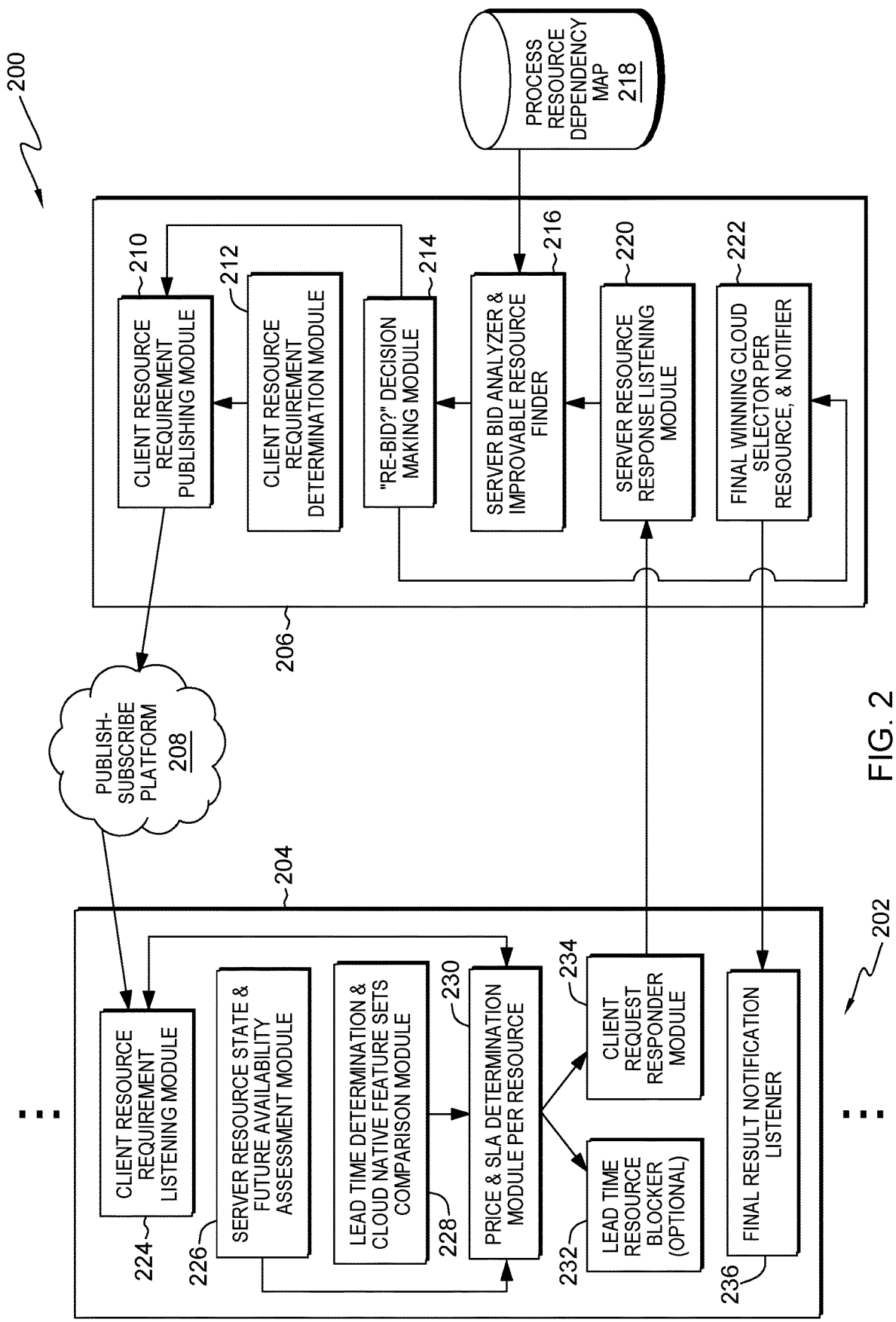
FIG. 2 depicts a combination block/flow diagram for one example of a system architecture, in accordance with one or more aspects of the present disclosure.

FIG. 2 depicts a combination block/flow diagram for one example of a system architecture 200, in accordance with one or more aspects of the present disclosure. The system architecture includes a number of providers 202 of cloud services, for example, cloud service provider 204, and a client 206 associated with a publish-subscribe platform 208 between the cloud service providers and the client. In one example, the client includes a module 210 for cloud resource requirement publishing, a module 212 for initially determining the cloud resource requirement, a module 214 for decision making with regard to revising a bid, a server 216 for bid analysis and improvable resource finder, which receives process resource dependency map data from a database 218, a module 220 that listens for a server resource response from cloud service provider 204, and a selector/notifier 222 for selecting one or more cloud service providers, which, in one embodiment, may be on a per-resource basis.

Example cloud service provider 204 includes a module 224 to listen for a client resource requirement from the publish-subscribe platform, a module 226 for assessing a server resource state and future availability, a module 228 for determining a lead time and comparing native feature sets of cloud services, a module 230 for price and Service Level Agreement (SLA) terms determination, which, in one embodiment, may be on a per-resource basis, an optional lead time resource blocker 232, a module 234 for responding to a client request, sending any responses to listening module 220 on the client side, and a final result notification listener 236, which receives the final result notification from notifier 222 on the client side.

To further explain FIG. 2, operation of the client 206 begins with module 212, determining the resource requirements of the client, the specifics of which are not germane to the present disclosure. Part of the resource requirement determination may include, in one example, determining a time needed for each resource. Module 210 then publishes via the publish-subscribe platform the client resource requirements, including the resource times, to the publish-subscribe platform (pub-sub platform) 208.

In software architecture, as previously mentioned, "publish-subscribe" refers to a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are. Thus, in one embodiment, the client may be anonymous to the providers and vice-versa.

In the publish-subscribe model, as previously mentioned, subscribers may receive only a subset of the total messages published. The process of selecting messages for reception and processing is called filtering. There are two common forms of filtering: topic-based and content-based.

In a topic-based system, as previously mentioned, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe.

In a content-based system, as previously mentioned, messages are only delivered to a subscriber if the attributes or content of those messages matches constraints defined by the subscriber. The subscriber is responsible for classifying the messages.

As previously mentioned, some systems support a hybrid of the two; publishers post messages to a topic while subscribers register content-based subscriptions to one or more topics.

In many pub/sub systems, as previously mentioned, publishers post messages to an intermediary message broker or event bus, and subscribers register subscriptions with that broker, letting the broker perform the filtering. The broker normally performs a store and forward function to route messages from publishers to subscribers. In addition, the broker may prioritize messages in a queue before routing.

Subscribers may register for specific messages at build time, initialization time or runtime. In GUI systems, subscribers can be coded to handle user commands input by any method (e.g., click of a button or voice input), which corresponds to build time registration. Some frameworks and software products use XML configuration files to register subscribers. These configuration files are read at initialization time. The most sophisticated alternative is when subscribers can be added or removed at runtime. This latter approach is used, for example, in database triggers, mailing lists, and RSS.

The Data Distribution Service (DDS) middleware does not use a broker in the middle. Instead, each publisher and subscriber in the pub/sub system shares meta-data about each other via IP multicast. The publisher and the subscribers cache this information locally and route messages based on the discovery of each other in the shared cognizance.

Publishers are loosely coupled to subscribers, and need not even know of their existence. With the topic being the focus, publishers and subscribers are allowed to remain ignorant of system topology. Each can continue to operate normally regardless of the other. In the traditional tightly coupled client-server paradigm, the client cannot post messages to the server while the server process is not running, nor can the server receive messages unless the client is running. Many pub/sub systems decouple not only the locations of the publishers and subscribers but also decouple them temporally. A common strategy used by middleware analysts with such pub/sub systems is to take down a publisher to allow the subscriber to work through the backlog (a form of bandwidth throttling).

Pub/sub provides the opportunity for better scalability than traditional client-server, through parallel operation, message caching, tree-based or network-based routing, etc. However, in certain types of tightly coupled, high-volume enterprise environments, as systems scale up to become data centers with thousands of servers sharing the pub/sub infrastructure, current vendor systems often lose this benefit; scalability for pub/sub products under high load in these contexts is a research challenge.

Outside of the enterprise environment, on the other hand, the pub/sub paradigm has proven its scalability to volumes far beyond those of a single data center, providing Internet-wide distributed messaging through web syndication protocols such as RSS and Atom. These syndication protocols accept higher latency and lack of delivery guarantees in exchange for the ability for even a low-end web server to syndicate messages to (potentially) millions of separate subscriber nodes.

Returning to FIG. 2, at the time of publishing, the pub-sub platform may also pass along a decision from module 214 as to whether, in one embodiment, the client decides whether to allow iterative bidding in the auction. As implied, bid analyzer/resource finder 216 analyzes provider bids received by listening module 220. Another aspect is the improvable resource finder, described in more detail below.

In one embodiment, an iterative bidding/response process is used. Iterative bidding is not necessarily performed in all embodiments of the invention. The objective of this aspect is re-negotiation of SLA terms and prices for cloud resources. The client performs an analysis of the pricing and bids received from each cloud service provider using outside resources not a part of the invention.

In one example, a client observes that some resources X provided by cloud provider A are good while some other resources Y provided by cloud A fall short of the SLA requirements (or are too highly priced), while some resources Y provided by cloud provider B are good and some other resources X provided by cloud B fall short of the SLA requirements (or are too highly priced). Further, the client may also observe that, some of the resource dependencies its processes have, are such that, if resource R1 and R2 have a dependency, then, the best SLA/pricing for R1 has been given by cloud provider A and that for R2 has been given by cloud provider B. In such cases, the client may, for example, publish a structured summary (such as a XML feed, for example) on the potential resources where improvements are possible (satisfying dependencies, better SLAs, better prices etc.), and thus, for those resources, re-runs the bidding/response process. In one embodiment, the client may publish a best offer it has received so far from each provider for each resource, which is factored into by the iterative bidding process participants. In one embodiment, the re-running of the bidding/response process is carried out up to a maximum of k iterations (k being given by a human or an automated external administrator).

Returning to FIG. 2, cloud service provider 204 begins operation when cloud resource requirement listening module 224 receives the client cloud resource requirement from the pub-sub platform, which includes a time for each resource, along with the iterative bidding decision.

Providing a publish-subscribe type of auction enabling platform between cloud consumers and cloud service providers where process analytics is performed for estimating resource requirement and published using client-side publishing and publishing bids by provider with information including timeslot and SLAs.

Disclosed is a system (including an auction enabling platform) and associated methods: for cloud service consumers—to expose (publish) their upcoming cloud resource requirements and for cloud service providers—to listen to such requirements (by, for example, subscribing to the resource requirements published by the consumers),—based upon the current and expected future resource availability within the cloud (that the cloud knows about itself) evaluate the feasibility, the best pricing (possibly for different time slots) and the resource levels the cloud service provider can provide to the consumer—and respond to the consumer or users with a list including, in one example, of multiple entries of the form <pricing, time slot, other SLA parameters>, or other forms of meaningful response that can be read by the auction enabling platform to understand the "bid" offered by the consumer to the cloud service provider.

In one embodiment, the above process occurs iteratively, where over a finite number of iterations and/or a time limit (or until the client selects a winner), the cloud service providers are made aware of the bids made by each of the competing clouds, and are allowed to re-adjust their previous bid, by altering, for example, the pricing, time slot/time duration and/or other SLA parameters either for the complete bid or for specific services offered on the respective cloud platforms. Such a cross-cloud bidding produces a series of a combination of SLA and pricing for a series of timeslots, for a consumer (client) to choose which cloud service providers (and cloud resources) to consume.

There are four main aspects disclosed herein, including client-side publishing of resource requirements, cloud bid and SLA formulation, iterative bidding/response process, and cloud service provider selection by consumer.

The objective of client-side publishing is for the client to announce to the cloud service providers, the resource requirements it has. Resource requirements are quantified for an application by, for example, the set of resources needed, and the time duration of the requirement (how long each resource will be needed).

The client will perform its process analytics to arrive at the resource requirements using external systems and methods that are not a part of this invention. The analytics will provide the client a resource requirement estimate in terms of the set and duration of the resources needed. The client publishes this requirement in a known publish-subscribe (or "pub-sub") system, wherein the cloud service providers will listen to such client requirement requests.

Cloud bid and SLA formulation starts when a cloud service provider listens to a client's invite to bid (when the client-side resource requirement publishing happens).

The objective of this aspect is for a cloud to determine the resources it can dedicate for as long as needed by the client, without impacting other processes being run in the cloud (or other processes committed to). The analytics for the cloud providers to arrive at a bid are not part of this invention. In case the cloud service provider can fulfill only a part of the client's requests, that may be noted as well. If started within a given time period from response (the "lead time"—the validity period of the "offer" made to the client by the cloud), the price that can be offered, and the SLA, are computed. In one embodiment, the resources could be blocked by a cloud service provider for the "lead time" amount of time-duration by the cloud, from the point of response. The pricing and SLA, for each resource, as well as a combined pricing (which might include a subgroup-of-resource level pricing also), are returned to the client by the cloud.

In one embodiment, a data processing system also analyzes the cloud service provider bids against the cloud resource requirements and provides a cognitive recommendation of a provider for each resource requirement.

The objective of cloud service provider selection is to simply complete the process of cloud selection (identification of winning bidder/winner), which may include more than one cloud service provider, for example, one or more different provider for one or more different resource requirement. The client assesses the best SLA and pricing received from each cloud service provider, and, for example, a potential impact analysis of such SLA and prices to its business. The impact analysis will be carried out by an external module or by person(s), the details of which are not a part of this invention. Finally, the client declares winners for each cloud resource. The clouds listen, and the winning cloud(s) provisions resources for the client as agreed in the bidding process. At this stage or if scheduled, the client starts or will start consuming the cloud services accordingly.

Certain embodiments herein may offer various technical computing advantages involving computing advantages to address problems arising in the realm of computer networks. Particularly, Various decision data structures can be used to drive artificial intelligence (AI) decision making, such as decision data structure that, in one embodiment, cognitively recommends to the client, by a data processing system, one or more of the cloud service providers for the at least one cloud resource requirement. Embodiments herein can include, for example, a computer-implemented method of auctioning cloud services, the computer-implemented method may include, for example: publishing, by a client, on a publish-subscribe platform, cloud resource requirement(s); subscribing to the publish-subscribe platform by at least two providers of cloud service(s); bidding, by each of the at least two providers, on the cloud resource requirement(s) via a bidding platform; and selecting, by the client, and publishing on the publish-subscribe platform, at least one of the at least two providers for the cloud resource requirement(s). Embodiments herein can include, for example, that the cloud resource requirement(s) include a set of cloud resources and a time needed for each cloud resource, the bidding including bidding, by each of the at least two providers on cloud resource(s) of the set of cloud resources, the cognitively recommending includes cognitively recommending, by the data processing system, one of the at least two providers for each cloud resource in the set of cloud resources, and the selecting includes selecting and publishing on the publish-subscribe platform, by the client, one of the at least two providers for each cloud resource of the set of cloud resources. Embodiments herein can include, for example, that each bid of each of the at least two providers includes a lead time, and the method further includes reserving, by one or more of the at least two providers, cloud resource(s) during the lead time. Embodiments herein can include, for example, that each bid of the bidding includes an agreement and at least one price. Embodiments herein can include, for example, that the client, prior to the publishing, chooses whether to allow iterative bidding for the bidding. Embodiments herein can include, for example, making each of the at least two providers aware of each bid by each provider of the at least two providers, that the bidding includes iteratively bidding within a predetermined window, and each of the at least two providers can update a bid. Embodiments herein can include, for example, that the predetermined window includes at least one of a time period and a maximum number of iterations for the iteratively bidding. Embodiments herein can include, for example, that the making includes the client periodically publishing via the publish-subscribe platform a best bid received. Embodiments herein can include, for example, using machine learning for the data processing system on data related to cloud resource bids, prices and terms, in order to improve the cognitively recommending.

In the case where one or more of the parties wants or needs to analyze a communication (e.g., a cloud service provider analyzing a client communication), Natural Language Understanding may be used.

The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, an online API service (Application Programming Interface), one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a Natural Language Classifier service with a conversation service if one wants their application to engage in a conversation with a user; and classifying frequently asked questions (FAQs).

In one example, a cognitive computer system performs the analysis. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—hey may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 3:
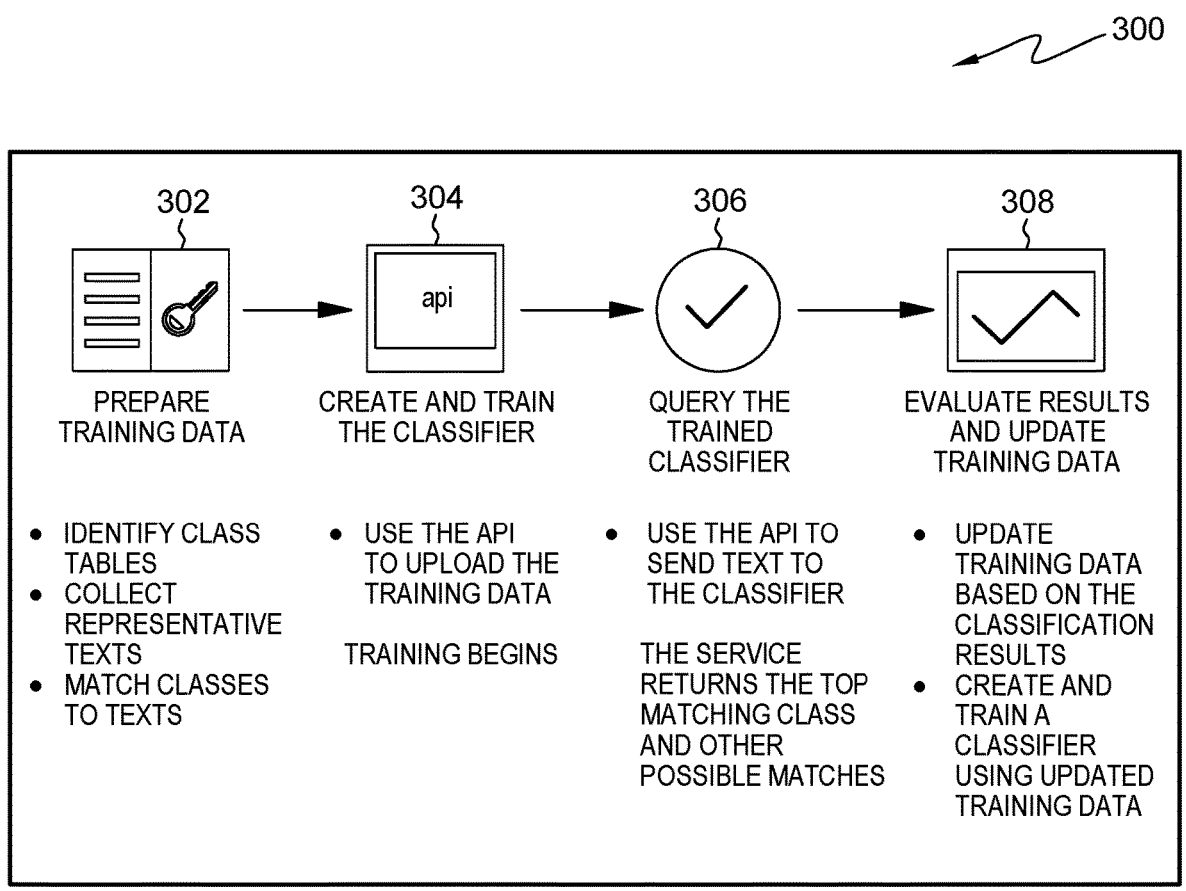
FIG. 3 is a modified flow diagram of one example of training a data processing system, in accordance with one or more aspects of the present disclosure.

FIG. 3 is a hybrid flow diagram 300 of one example of an overview of the basic steps for creating and using a natural language classifier service. Initially, training data for machine learning is prepared, 302, by identifying class tables, collecting representative texts and matching the classes to the representative texts. An API (Application Planning Interface) may then be used to create and train the classifier 304 by, for example, using the API to upload training data. Training may begin at this point. After training, queries can be made to the trained natural language classifier, 306. For example, the API may be used to send text to the classifier. The classifier service then returns the matching class, along with other possible matches. The results may then be evaluated and the training data updated, 308, for example, by updating the training data based on the classification results. Another classifier can then be trained using the updated training data.

An NLU process to process data for preparation of records that are stored in a database and for other purposes can be used. For example, a Natural Language Understanding (NLU) process for determining one or more NLU output parameter of text (e.g., in a message or other published communication). NLU process can include one or more of a topic classification process that determines topics of messages and output one or more topic NLU output parameter, a sentiment analysis process which determines sentiment parameter for a published communication, e.g. polar sentiment NLU output parameters, such as "negative," "positive," and/or non-polar NLU output sentiment parameters, e.g. "anger," "disgust," "fear," "joy," and/or "sadness" or other classification process for output of one or more other NLU output parameters, for example, one or more "writing style" NLU output parameter.

The running of such an NLU process allows for performance of a number of processes including, for example, one or more of (a) topic classification and output of one or more topic NLU output parameter for a received message (b) sentiment classification and output of one or more sentiment NLU output parameter for a received message or (c) other NLU classifications and output of one or more other NLU output parameter for the received message or other communication.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, the term "cognitive recommendations" refers to the use of cognitive computing in making cloud service provider recommendations to clients in real-time. Cognitive computing is the simulation of human thinking, using software and/or hardware, which may be enhanced/improved using machine learning. Machine learning is based in mathematics and statistical techniques, giving computer systems the ability to "learn" with data provided, for example, a relatively large amount of data related to cloud services in this case (e.g., cost, terms, etc.), without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation in some manner (e.g., on a display on the client side) to a client or user to take place, and which is fast enough that a client (i.e., a person(s)) does not perceive any significant delay and provides the information with enough time for the client to make the ultimate decision as to cloud service provider(s).

The cloud provider recommendation can be presented, for example, through a display-based connected device, e.g., a smart mirror, a tablet, smartphone, kiosk, hologram, augmented reality, virtual reality, etc. The display-based connected device may be, for example, interactive with users. The recommendation to the user may be, for example, in the form of a push message (with or without an image or video component) or updated website or app interaction. Periodically, actual client decisions and other information as to cloud providers may be used to retrain the system to improve and drive the recommendations using existing software such as, for example, a cognitive recommendation service.

In one embodiment, a system to facilitate providing cognitive recommendations can include at a high level, for example, a front end, a back end, a backbone and a search engine. A "front end" in this context refers to an intake module for client information and related data. In one example, the front end can be a distributed linear algebra framework and mathematically expressive domain specific language. The front end serves as a scalable machine-learning library. A "back end" in this context refers to, for example, a cluster-computing framework; it is a general purpose "big data" processing engine. Some common uses of such a back end include, for example, interactive queries across large data sets and machine learning. A "backbone" in this context refers to software for use with big data analytics. A "search engine" in this context refers to a large-scale enterprise search platform.

In one example, the recommendation system runs a machine learning process that can update one or more process run by the recommendation system based on obtained data to improve and accuracy and/or reliability of the one or more process. In one embodiment, the recommendation system may, for example, use a decision data structure to assist in formulating the recommendation. Such a decision data structure may include, for example, data as to historical auction results and any discerned reasoning as to a client decisions on cloud providers.

Such a recommendation system in one embodiment can run a plurality of instances of such a decision data structure, each instance for a different client currently in a cloud services auction. For each instance of the decision data structure, the recommendation system can vary the circumstances. Such a recommendation system running a machine learning process can continually or periodically update the circumstances of the different instances of the decision data structure. The recommendation system can monitor on-going cloud services auctions to establish and update the different data structures.

In one example, a recommendation system can run preparation and maintenance processes to populate and maintain data as to auctions and outcomes (including any discernable reasoning) for use by various processes run by the recommendation system.

In a first aspect, disclosed above is a computer-implemented method of on-demand auctioning of cloud computing services. The computer-implemented method includes publishing, by a client, on a publish-subscribe platform, at least one cloud computing resource requirement; subscribing to the publish-subscribe platform by at least two providers of cloud computing service(s); bidding, by each of the at least two providers, on one or more of the cloud computing resource requirement(s) via a bidding platform; and selecting, by the client, and publishing on the publish-subscribe platform, at least one of the at least two providers for the cloud resource computing requirement(s).

In one example, the method may include, for example, prior to the selecting, cognitively recommending to the client, by a data processing system, one or more of the at least two providers. In one example, the cloud resource requirements may include, for example, a set of cloud resources and a time needed for each cloud resource, the bidding may include, for example, bidding, by each of the at least two providers on cloud resource(s) of the set of cloud resources, the cognitively recommending may include, for example, cognitively recommending, by the data processing system, one of the at least two providers for each cloud resource in the set of cloud resources, and the selecting may include, for example, selecting and publishing on the publish-subscribe platform, by the client, one of the at least two providers for each cloud resource of the set of cloud resources.

In one example, each bid of each of the at least two providers in the computer-implemented method of the first aspect may include, for example, a lead time, and the method may further include, for example, reserving, by one or more of the at least two providers, cloud resource(s) during the lead time.

In one example, each bid of the bidding in the computer-implemented method of the first aspect may include, for example, an agreement and price(s).

In one example, the client in the computer-implemented method of the first aspect, prior to the publishing, may, for example, choose whether to allow iterative bidding for the bidding. In one example, the method may further include, for example, making each of the at least two providers aware of each bid by each provider of the at least two providers, the bidding may include, for example, iteratively bidding within a predetermined window, and each of the at least two providers may, for example, update a bid. In one example, the predetermined window may include, for example, at least one of a time period and a maximum number of iterations for the iteratively bidding. In one example, the making may include, for example, the client periodically publishing, via the publish-subscribe platform, a best bid received. In one example, the computer-implemented method of the first aspect may further include, for example, using machine learning for the data processing system on data related to cloud resource bids, prices and terms, in order to improve the cognitively recommending.

In a second aspect, disclosed above is a system for on-demand auctioning of auctioning computing cloud services. The system includes a memory, and processor(s) in communication with the memory, the memory storing program instructions for performing a method, the program instructions executable by the processor(s) to perform the method. The method includes publishing, by a client, on a publish-subscribe platform, at least one cloud computing resource requirement; subscribing to the publish-subscribe platform by at least two providers of cloud computing service(s); bidding, by each of the at least two providers, on one or more of the cloud computing resource requirement(s) via a bidding platform; and selecting, by the client, and publishing on the publish-subscribe platform, at least one of the at least two providers for the cloud resource computing requirement(s).

In one example, the method in the system of the second aspect may further include, for example, prior to the selecting, cognitively recommending to the client, by a data processing system, one or more of the at least two providers. In one example, the cloud resource requirements may include, for example, a set of cloud resources and a time needed for each cloud resource, the bidding may include, for example, bidding, by each of the at least two providers on one or more cloud resource of the set of cloud resources, the cognitively recommending may include, for example, cognitively recommending, by the data processing system, one of the at least two providers for each cloud resource in the set of cloud resources, and the selecting may include, for example, selecting and publishing on the publish-subscribe platform, by the client, one of the at least two providers for each cloud resource of the set of cloud resources.

In one example, the method in the system of the second aspect may further include, for example, making each of the at least two providers aware of each bid by each other provider of the at least two providers, the bidding may include, for example, iteratively bidding within a predetermined window, the predetermined window including at least one of a time period and a maximum number of iterations for the iteratively bidding, and each of the at least two providers may, for example, update a bid.

In one example, the method in the system of the second aspect may further include, for example, using machine learning for the data processing system on data related to cloud resource bids, prices and terms, in order to improve the cognitively recommending.

In a third aspect, disclosed above is a computer program product for on-demand auctioning of cloud computing services. The computer program product includes a storage medium readable by a processor and storing instructions for performing a method of auctioning cloud computing services. The method includes publishing, by a client, on a publish-subscribe platform, at least one cloud computing resource requirement; subscribing to the publish-subscribe platform by at least two providers of cloud computing service(s); bidding, by each of the at least two providers, on one or more of the cloud computing resource requirement(s) via a bidding platform; and selecting, by the client, and publishing on the publish-subscribe platform, at least one of the at least two providers for the cloud resource computing requirement(s).

In one example, the method in the computer program product of the third aspect may further include, for example, prior to the selecting, cognitively recommending to the client, by a data processing system, one or more of the at least two providers. In one example, the method may further include, for example, using machine learning for the data processing system on data related to cloud resource bids, prices and terms, for example, in order to improve the cognitive recommendations.

In one example, the cloud resource requirements in the method in the computer program product of the third aspect may include, for example, a set of cloud resources and a time needed for each cloud resource, the bidding may include, for example, bidding, by each of the at least two providers on cloud resource(s) of the set of cloud resources, the cognitively recommending may include, for example, cognitively recommending, by the data processing system, one of the at least two providers for each cloud resource in the set of cloud resources, and the selecting may include, for example, selecting and publishing on the publish-subscribe platform, by the client, one of the at least two providers for each cloud resource of the set of cloud resources.

In one example, the method in the computer program product of the third aspect may further include, for example, making each of the at least two providers aware of each bid by each provider of the at least two providers, the bidding may include, for example, iteratively bidding within a predetermined window, the predetermined window including at least one of a time period and a maximum number of iterations for the iteratively bidding, and each of the at least two providers can update a bid.

In one example, the computer program product of the third aspect may further include, for example, using machine learning for the data processing system on data related to cloud resource bids, prices and terms, for example, in order to improve the cognitive recommendations.

Figure 4:
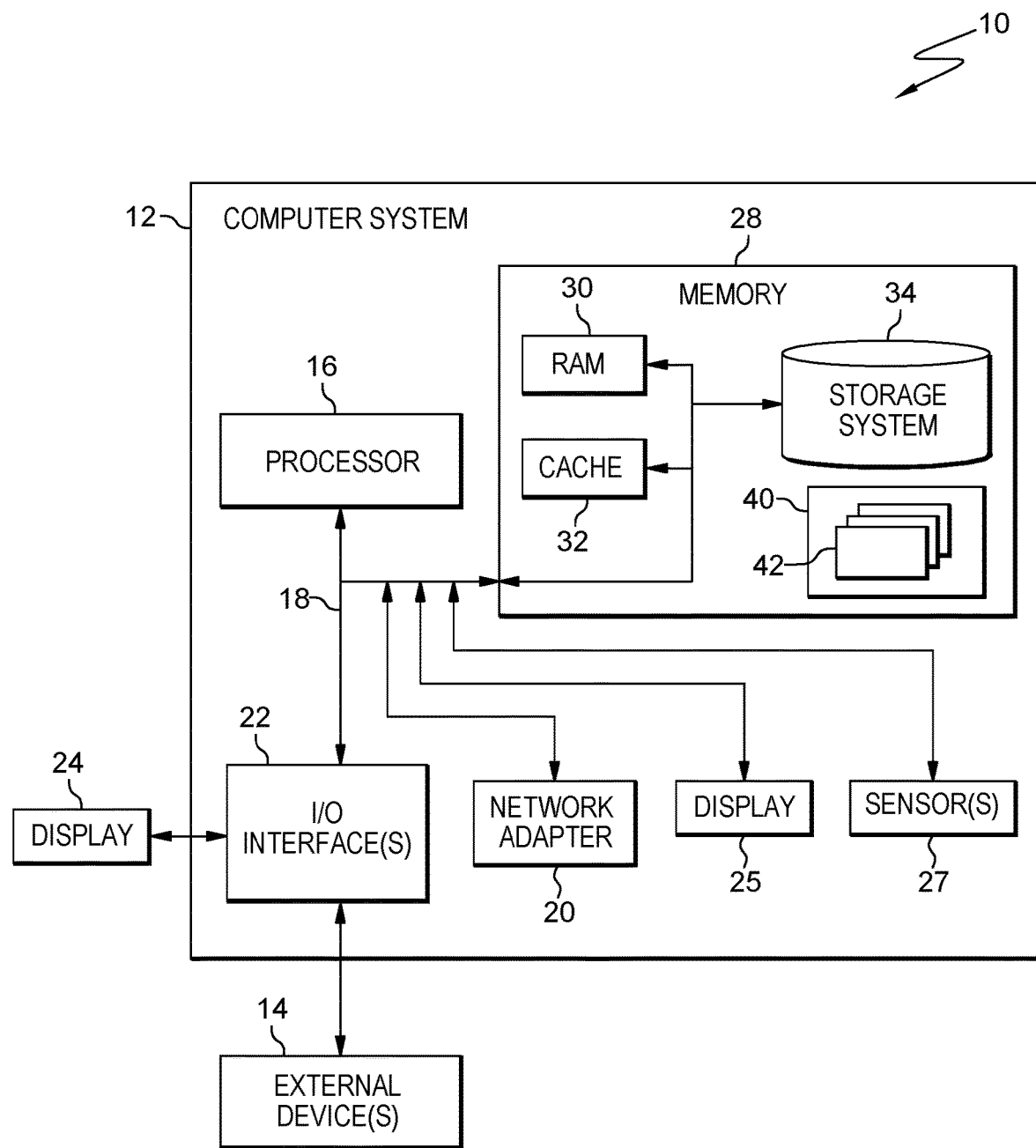
FIG. 4 is a block diagram of one example of a computer system, in accordance with one or more aspects of the present disclosure.
Figure 5:
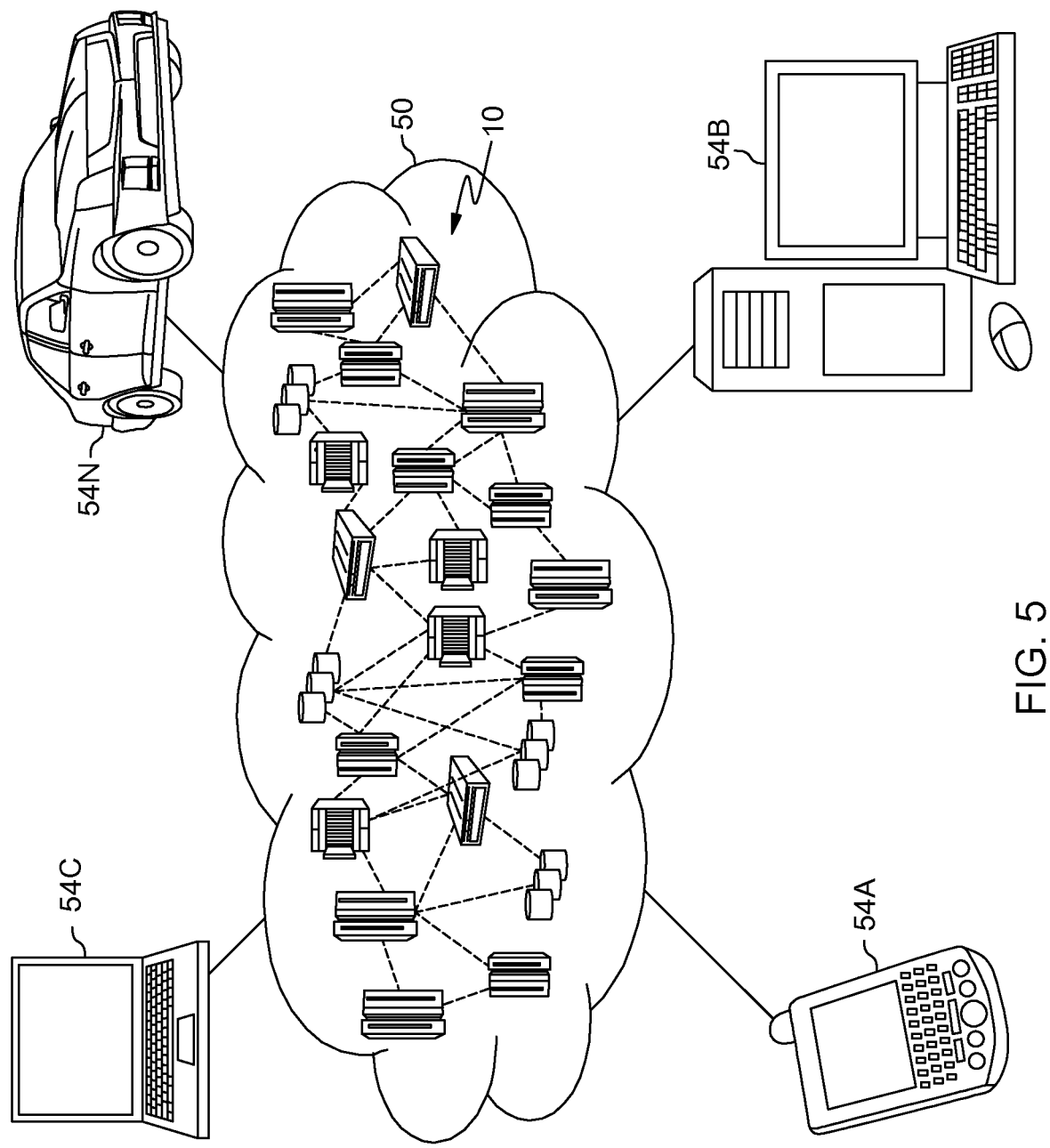
FIG. 5 is a block diagram of one example of a cloud computing environment, in accordance with one or more aspects of the present disclosure.
Figure 6:
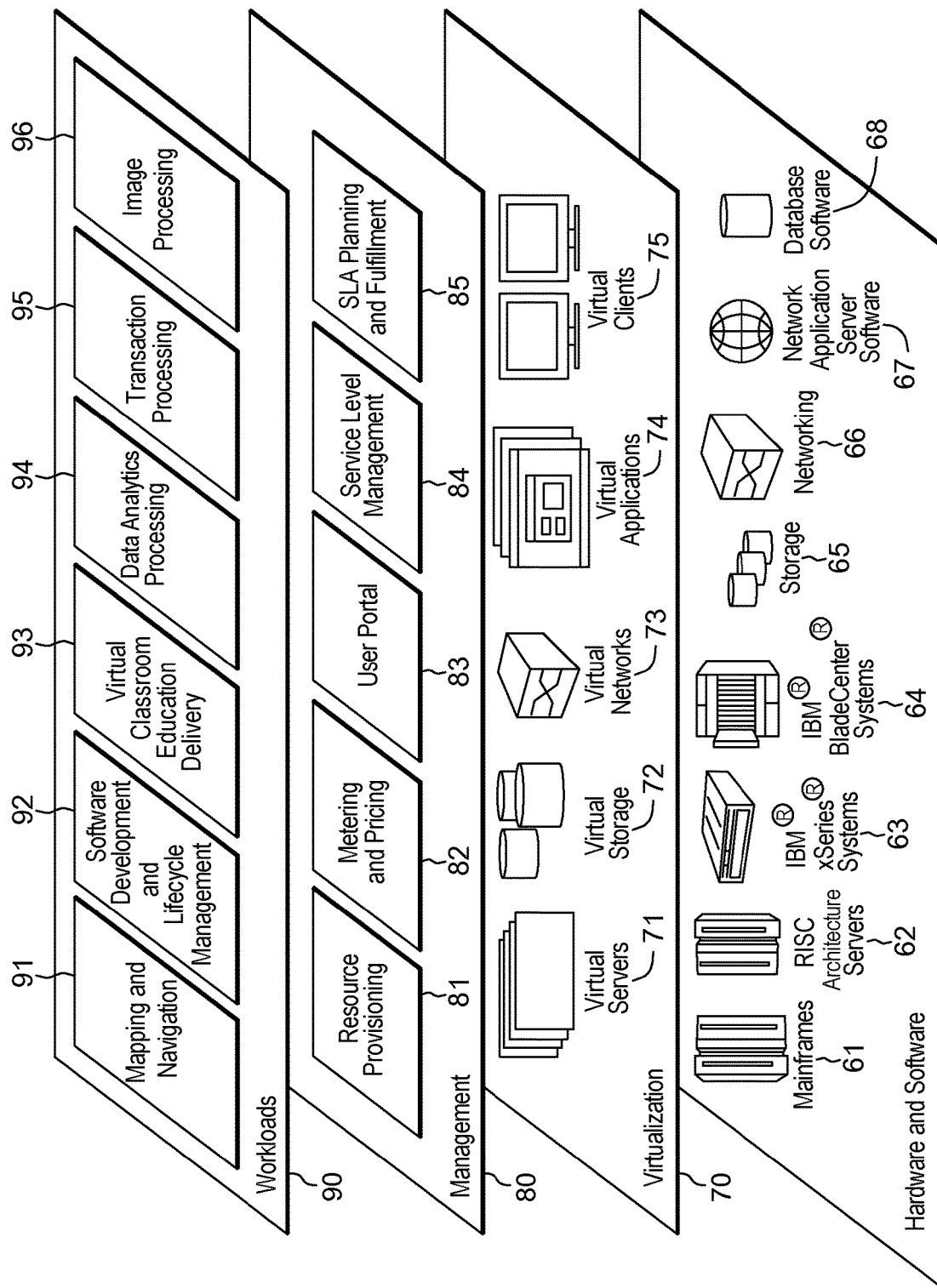
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing various functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of on-demand auctioning of cloud computing services, the computer-implemented method comprising:

publishing, by a consumer of at least one cloud computing resource, on a publish-subscribe platform, at least one cloud computing resource requirement;

subscribing to the publish-subscribe platform by at least two providers of one or more cloud computing service;

bidding, by each of the at least two providers, on one or more of the at least one cloud computing resource requirement via a bidding platform such that the at least two providers bid to provide the one or more of the at least one cloud computing resource to the consumer; and selecting, by the consumer, and publishing on the publish-subscribe platform, at least one of the at least two providers for the at least one cloud computing resource requirement.

2. The computer-implemented method of claim 1, further comprising, prior to the selecting, cognitively recommending to the consumer, by a data processing system, one or more of the at least two providers.

3. The computer-implemented method of claim 2, wherein the cloud resource requirements comprise a set of cloud resources and a time needed for each cloud resource, wherein the bidding comprises bidding, by each of the at least two providers on one or more cloud resource of the set of cloud resources, wherein the cognitively recommending comprises cognitively recommending, by the data processing system, one of the at least two providers for each cloud resource in the set of cloud resources, and wherein the selecting comprises selecting and publishing on the publish-subscribe platform, by the consumer, one of the at least two providers for each cloud resource of the set of cloud resources.

4. The computer-implemented method of claim 1, wherein each bid of each of the at least two providers comprises a lead time, and wherein the method further comprises reserving, by one or more of the at least two providers, one or more cloud resource during the lead time.

5. The computer-implemented method of claim 1, wherein each bid of the bidding comprises an agreement and at least one price.

6. The computer-implemented method of claim 1, wherein the consumer, prior to publishing the at least one cloud computing resource requirement, chooses whether to allow iterative bidding for the bidding.

7. The computer-implemented method of claim 6, further comprising making each of the at least two providers aware of each bid by each other provider of the at least two providers, wherein the bidding comprises iteratively bidding within a predetermined window, and wherein each of the at least two providers can update a bid.

8. The computer-implemented method of claim 7, wherein the predetermined window comprises at least one of a time period and a maximum number of iterations for the iteratively bidding.

9. The computer-implemented method of claim 7, wherein the making comprises the consumer periodically publishing, via the publish-subscribe platform, a best bid received.

10. The computer-implemented method of claim 1, further comprising:
providing a data processing system for on-demand auctioning of cloud computing services;
prior to the selecting, cognitively recommending to the consumer, by the data processing system, one or more of the at least two providers; and
using machine learning for the data processing system on data related to cloud resource bids, prices and terms, in order to improve the cognitively recommending.

11. A system for on-demand auctioning of cloud computing services, the system comprising:
a memory; and
at least one processor in communication with the memory, the memory storing program instructions for performing a method, the program instructions executable by the at least one processor to perform a method, the method comprising:
publishing, by a consumer of at least one cloud computing resource, on a publish-subscribe platform, at least one cloud computing resource requirement;
subscribing to the publish-subscribe platform by at least two providers of one or more cloud computing service;
bidding, by each of the at least two providers, on one or more of the at least one cloud computing resource requirement via a bidding platform such that the at least two providers bid to provide the one or more of the at least one cloud computing resource to the consumer; and
selecting, by the consumer, and publishing on the publish-subscribe platform, at least one of the at least two providers for the at least one cloud computing resource requirement.

12. The system of claim 11, further comprising, prior to the selecting, cognitively recommending to the consumer, by the system, one or more of the at least two providers.

13. The system of claim 12, wherein the cloud resource requirements comprise a set of cloud resources and a time needed for each cloud resource, wherein the bidding comprises bidding, by each of the at least two providers on one or more cloud resource of the set of cloud resources, wherein the cognitively recommending comprises cognitively recommending, by the system, one of the at least two providers for each cloud resource in the set of cloud resources, and wherein the selecting comprises selecting and publishing on the publish-subscribe platform, by the consumer, one of the at least two providers for each cloud resource of the set of cloud resources.

14. The system of claim 11, the method further comprising making each of the at least two providers aware of each bid by each other provider of the at least two providers, wherein the bidding comprises iteratively bidding within a predetermined window, the predetermined window comprising at least one of a time period and a maximum number of iterations for the iteratively bidding, and wherein each of the at least two providers can update a bid.

15. The system of claim 11, further comprising:
providing a data processing system for on-demand auctioning of cloud computing services;
prior to the selecting, cognitively recommending to the consumer, by the data processing system, one or more of the at least two providers; and
using machine learning for the data processing system on data related to cloud resource bids, prices and terms, in order to improve the cognitively recommending.

16. A computer program product for on-demand auctioning of cloud computing services, the computer program product comprising:
a storage medium readable by a processor and storing instructions for performing a method, the method comprising:
publishing, by a consumer, on a publish-subscribe platform, at least one cloud computing resource requirement;
subscribing to the publish-subscribe platform by at least two providers of one or more cloud computing service;
bidding, by each of the at least two providers, on one or more of the at least one cloud computing resource requirement via a bidding platform such that the at least two providers bid to provide the one or more of the at least one cloud computing resource to the consumer; and
selecting, by the consumer, and publishing on the publish-subscribe platform, at least one of the at least two providers for the at least one cloud computing resource requirement.

17. The computer program product of claim 16, further comprising, prior to the selecting, cognitively recommending to the consumer, by a data processing system, one or more of the at least two providers.

18. The computer program product of claim 17, further comprising using machine learning for the data processing system on data related to cloud resource bids, prices and terms, in order to improve the cognitively recommending.

19. The computer program product of claim 17, wherein the cloud resource requirements comprise a set of cloud resources and a time needed for each cloud resource, wherein the bidding comprises bidding, by each of the at least two providers on one or more cloud resource of the set of cloud resources, wherein the cognitively recommending comprises cognitively recommending, by the data processing system, one of the at least two providers for each cloud resource in the set of cloud resources, and wherein the selecting comprises selecting and publishing on the publish-subscribe platform, by the consumer, one of the at least two providers for each cloud resource of the set of cloud resources.

20. The computer program product of claim 16, the method further comprising making each of the at least two providers aware of each bid by each provider of the at least two providers, wherein the bidding comprises iteratively bidding within a predetermined window, the predetermined window comprising at least one of a time period and a maximum number of iterations for the iteratively bidding, and wherein each of the at least two providers can update a bid.

* * * * *